(12) United States Patent
Kondoh et al.

(10) Patent No.: US 7,559,866 B2
(45) Date of Patent: Jul. 14, 2009

(54) HYDRAULIC CONTROL APPARATUS FOR AUTOMATIC TRANSMISSION

(75) Inventors: Noriyoshi Kondoh, Nagoya (JP); Shigeo Takahashi, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 400 days.

(21) Appl. No.: 11/607,982

(22) Filed: Dec. 4, 2006

(65) Prior Publication Data

US 2007/0135253 A1 Jun. 14, 2007

(30) Foreign Application Priority Data

Dec. 9, 2005 (JP) .............................. 2005-357054

(51) Int. Cl.
*F16H 59/02* (2006.01)

(52) U.S. Cl. ..................................... 475/127

(58) Field of Classification Search ................. 475/116, 475/127–130
See application file for complete search history.

(56) References Cited

U.S. PATENT DOCUMENTS

| | | | |
|---|---|---|---|
| 3,897,698 A * | 8/1975 | Ohsaka ........................ | 475/61 |
| 5,577,584 A | 11/1996 | Ortmann | |
| 5,906,555 A * | 5/1999 | Sakaguchi et al. ............ | 475/61 |
| 5,911,244 A | 6/1999 | Long et al. | |
| 6,155,949 A | 12/2000 | Long et al. | |
| 6,485,388 B2 * | 11/2002 | Kim et al. .................... | 475/127 |
| 6,712,726 B1 * | 3/2004 | Jackson et al. ............... | 475/127 |
| 7,028,980 B2 * | 4/2006 | Kokubu et al. ......... | 251/129.15 |
| 7,282,005 B2 * | 10/2007 | Shimizu et al. .............. | 475/127 |
| 7,306,543 B2 * | 12/2007 | Honda et al. ................ | 477/160 |
| 7,325,885 B2 * | 2/2008 | Berger et al. ............. | 303/117.1 |
| 7,438,660 B2 * | 10/2008 | Long et al. .................. | 475/127 |

FOREIGN PATENT DOCUMENTS

JP 6-033953 A 2/1994

* cited by examiner

*Primary Examiner*—Ha D. Ho
(74) *Attorney, Agent, or Firm*—Buchanan Ingersoll & Rooney PC

(57) ABSTRACT

A hydraulic control apparatus for an automatic transmission which supplies a controlled hydraulic pressure to a engagement element includes a control valve unit including a line pressure input port, an output port for outputting the controlled hydraulic pressure, a spool for selectively opening and closing the line pressure input port and the output port, a spring for biasing the spool in one direction, a feedback hydraulic chamber, a pilot pressure chamber, a pilot pressure control device, a sleeve, a plunger positioned inside of the sleeve, and at least one plunger hydraulic chamber for pushing the plunger when the controlled hydraulic pressure is introduced therein so as to push the spool in a direction against the biasing direction of the spring. The hydraulic control apparatus further includes a switching device provided at a hydraulic passage between the output port and the plunger hydraulic chamber and for selectively establishing a communication therebetween.

20 Claims, 12 Drawing Sheets

F I G. 13
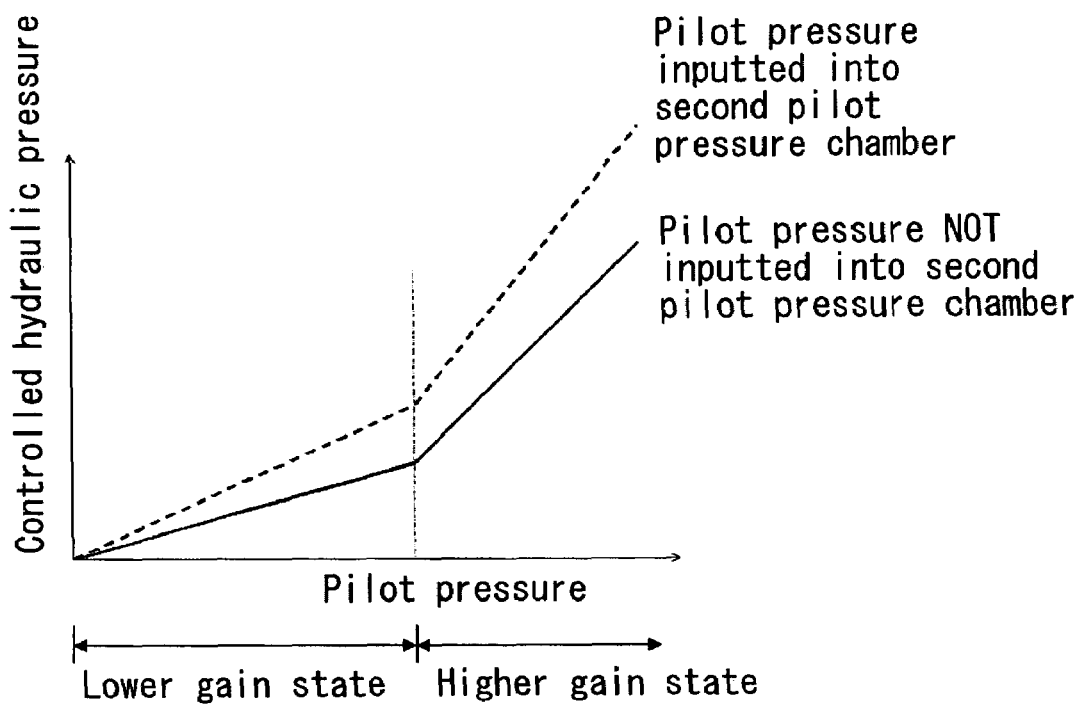

HYDRAULIC CONTROL APPARATUS FOR AUTOMATIC TRANSMISSION

CROSS REFERENCE TO RELATED APPLICATIONS

This application is based on and claims priority under 35 U.S.C. §119 with respect to Japanese Patent Application No. 2005-357054 filed on Dec. 9, 2006, the entire content of which is incorporated herein by reference.

FIELD OF THE INVENTION

The present invention relates to a hydraulic control apparatus for an automatic transmission. More particularly, the present invention pertains to a hydraulic control apparatus for an automatic transmission which supplies controlled hydraulic pressure from a control valve to a engagement element.

BACKGROUND

Known hydraulic control apparatuses for automatic transmissions have been disclosed, which directly controls hydraulic pressure from a hydraulic power source in accordance with an electric signal to control hydraulic pressure supplied to a engagement element in order to obtain smooth and high-responsive feeling when changing shifts.

According to a known hydraulic control apparatus for an automatic transmission described in U.S. Pat. No. 5,577,584 (FIG. 1), pressure gain is changed by applying the pressurized oil to control lands (26, 28) which have the difference in dimensions by changing controlled pressure supplied from a regulator valve (14) to a engagement element (10) by a shift valve (16).

According to a known hydraulic control apparatus for an automatic transmission described in U.S. Pat. No. 5,911,244 (FIG. 1), by changing controlled pressure supplied from a regulator valve (14) to a engagement element (54) by means of a control valve (16), pressurized oil applied to control lands (36, 38) which have the difference in dimensions via an orifice (66) is supplied from a passage (56) to a passage (58) to change pressure gain by applying the pressurized oil to control lands (36, 38) which have the difference in dimensions.

According to a known hydraulic control apparatus for an automatic transmission described in JPH06-33953 (FIG. 1), pressure gain is changed by applying controlled pressure to a control land (8b) of a fastening pressure control valve (7) and a plug (9) by a switching valve (11) which have the difference in dimensions.

According to the known hydraulic control apparatuses for the automatic transmissions, by changing a dimension, to which hydraulic pressure applies, of a chamber into which the pressure to change the gain is supplied, characteristics of outputted pressure of a control valve can be changed.

Notwithstanding, it is necessary to replace a spool and a valve body simultaneously when changing characteristics of outputted pressure of a control valve by changing a dimension, to which the hydraulic pressure applies, of a chamber into which the pressure to change the gain is supplied. This brings a significant change in practice in order to conform to required characteristics. Accordingly, there is a drawback practically in order to respond to varieties of characteristics of an outputted pressure of a control valve.

Generally, a shift is changed at a lower gain side at which controllability is high, and the pressure gain is switched to a higher gain side after the completion of the shift change. However, with the construction of the known hydraulic control apparatus for the automatic transmission described in U.S. Pat. No. 5,911,244, because the size of a plug valve of a regulator valve is large, when switching the pressure gain from the lower gain to the higher gain, there are drawbacks that a volume change of a TRIM is significant, a controlled pressure declines, and a torque amount applied to a engagement element declines.

A need thus exists for a hydraulic control apparatus for an automatic transmission, which conforms to varieties of characteristics of an outputted pressure of a control valve by a slight change.

SUMMARY OF THE INVENTION

In light of the foregoing, the present invention provides a hydraulic control apparatus for an automatic transmission which supplies a controlled hydraulic pressure, which is generated by regulating a line pressure supplied from a hydraulic pressure source, to a engagement element, which includes a control valve unit including a line pressure input port to which the line pressure is inputted, an output port for outputting the controlled hydraulic pressure, a spool housed in a valve body so as to slide therein and for selectively opening and closing the line pressure input port and the output port, a spring for biasing the spool in one direction, a feedback hydraulic chamber introduced with the controlled hydraulic pressure and operated to push the spool in a biasing direction of the spring, a pilot pressure chamber filled with a pilot pressure and operated to push the spool against a biasing force of the spring, a pilot pressure control device for controlling the pilot pressure in the pilot pressure chamber, a sleeve provided at an opposite side of the spring relative to the spool, a plunger positioned inside of the sleeve so as to slide therein, and at least one plunger hydraulic chamber for pushing the plunger when the controlled hydraulic pressure is introduced therein so as to push the spool in a direction against the biasing direction of the spring. The hydraulic control apparatus for the automatic transmission further includes a switching device provided at a hydraulic passage between the output port and the plunger hydraulic chamber and for selectively establishing a communication between the output port and the plunger hydraulic chamber.

BRIEF DESCRIPTION OF THE DRAWINGS

The foregoing and additional features and characteristics of the present invention will become more apparent from the following detailed description considered with reference to the accompanying drawings, wherein:

FIG. 13 is a graph schematically showing characteristics of controlled hydraulic pressure outputted from a control valve unit of the hydraulic control apparatus for the automatic transmission according to the second embodiment of the present invention.

DETAILED DESCRIPTION

Embodiments of the present invention will be explained with reference to illustrations of drawing figures as follows.

Figure 1:
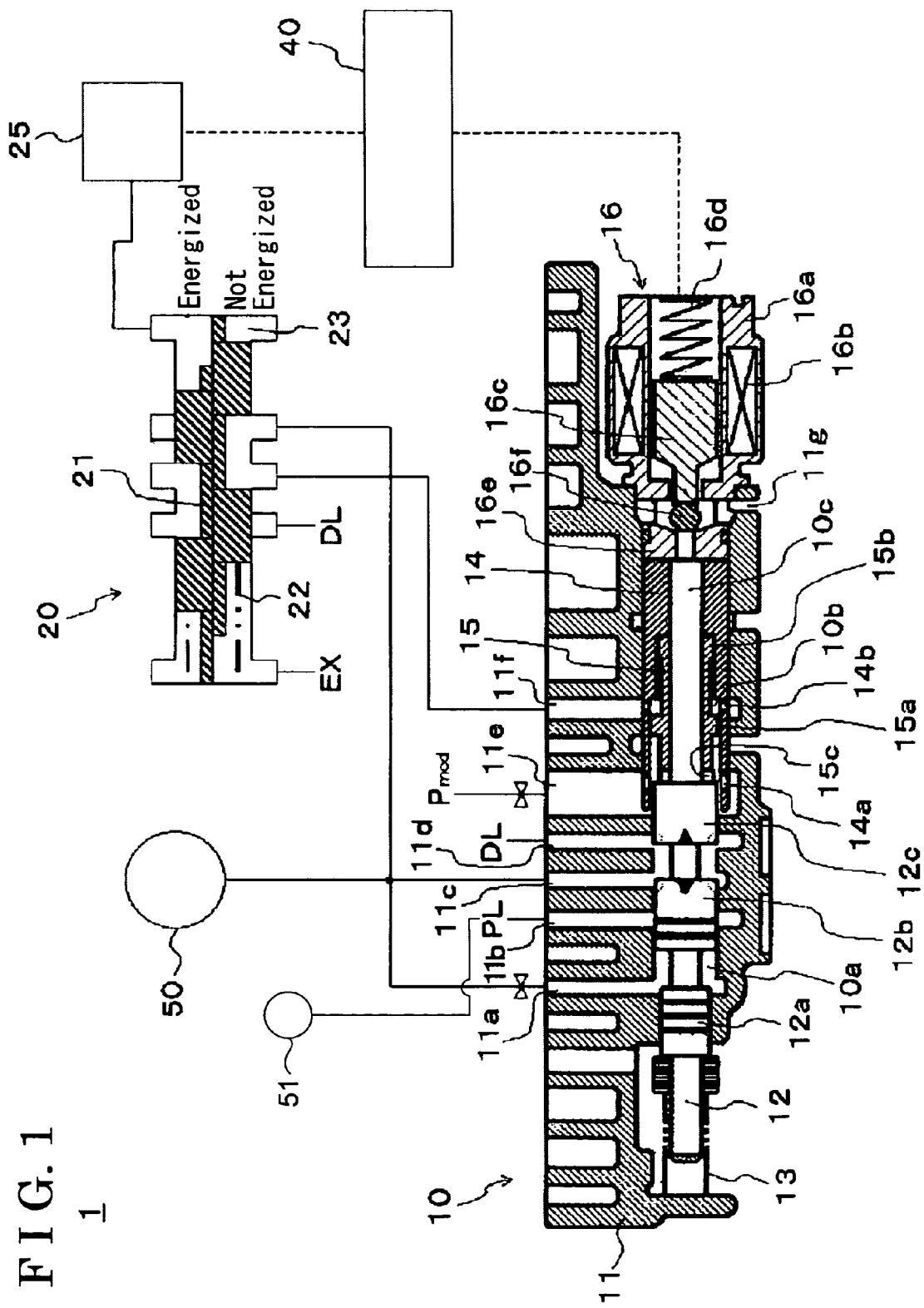
FIG. 1 is a hydraulic circuit diagram schematically showing a structure of a hydraulic control apparatus for an automatic transmission, which is in an assembled state, or in a state where a pilot pressure does not affect a spool according to a first embodiment of the present invention.

A first embodiment will be explained referring to FIGS. 1-7. A hydraulic control apparatus 1 according to the embodiment of the present invention is applied as a hydraulic control apparatus for an automatic transmission, which changes a shift range by combinations of supply/exhaust of hydraulic pressure to plural engagement elements. As shown in FIG. 1, the hydraulic control apparatus 1 for the automatic transmission includes a control valve unit 10, a shift valve means 20 (i.e., serving as a switching device), a controller 40, and a engagement element 50.

The control valve unit 10 applies pilot pressure to a spool 12, provided in a valve body 11, by a solenoid valve 16 (i.e., serving as a pilot pressure control device), regulates controlled hydraulic pressure on the basis of line pressure PL, which is introduced from an oil pump 51 serving as a hydraulic power source, and outputs regulated controlled hydraulic pressure to the engagement element 50. The control valve unit 10 includes the valve body 11 which houses the spool 12, a spring 13, a sleeve 14, a plunger 15, and the solenoid valve 16. The spool 12 is configured to slide in the valve body 11 and selectively opens and closes a line pressure input port 11b and an output port 11c described hereinafter.

The valve body 11 houses the spool 12 and the sleeve 14 and also serves as a member which constructs a hydraulic circuit. In the valve body 11, the solenoid valve 16 is attached at a first end side of the spool 12 in an axial direction via the sleeve 14 and the plunger 15, and a second end of the spool 12 in the axial direction is biased by means of the spring 13. In the valve body 11, an internal diameter of a portion which supports a first land 12a of the spool 12 is smaller than internal diameters of portions which support a second land 12b and a third land 12c of the spool 12. Further, in the valve body 11, the internal diameter of the portions which support the second land 12b and the third land 12c is smaller than an internal diameter of a portion which supports the sleeve 14. The valve body 11 includes a first feedback port 11a, the line pressure input port 11b, the output port 11c, an exhaust port 11d, a modulator pressure input port 11e, a second feedback port 11f, and an exhaust port 11g in order to be positioned closer to the spring 13.

The first feedback port 11a is for feeding back controlled hydraulic pressure from the output port 11c to a feedback hydraulic chamber 10a, and the controlled hydraulic pressure outputted from the output port 11c is inputted into the feedback hydraulic chamber 10a through an orifice. A line pressure PL from the oil pump 51 is introduced to the line pressure input port 11b. The output port 11c is configured to output the controlled hydraulic pressure, which is modulated by regulating the line pressure PL, to the engagement element 50 when engaging the engagement element 50. The exhaust port 11d exhausts pressurized oil when regulating the hydraulic pressure in the control valve unit 10. The modulator pressure input port 11e inputs modulator pressure $P_{mod}$ introduced from a modulator valve via an orifice into a pilot pressure chamber 10c through a gap between the sleeve 14 and the land 12c, a passage (i.e., hole) 14a, and a passage (i.e., hole) 15c. The second feedback port 11f feeds back the controlled hydraulic pressure, which is inputted to the feedback port 11f from the output port 11c through the shift valve means 20, to a plunger hydraulic chamber 10b through a passage (i.e., hole) 14b when the hydraulic pressure is inputted from an on/off solenoid valve 25 to a hydraulic chamber 23 of the shift valve means 20. The exhaust port 11g exhausts the hydraulic pressure from the solenoid valve 16 as necessity arises when the pilot pressure is modulated from the modulator pressure $P_{mod}$ introduced into the pilot pressure chamber 10c by the solenoid valve 16.

Figure 2:
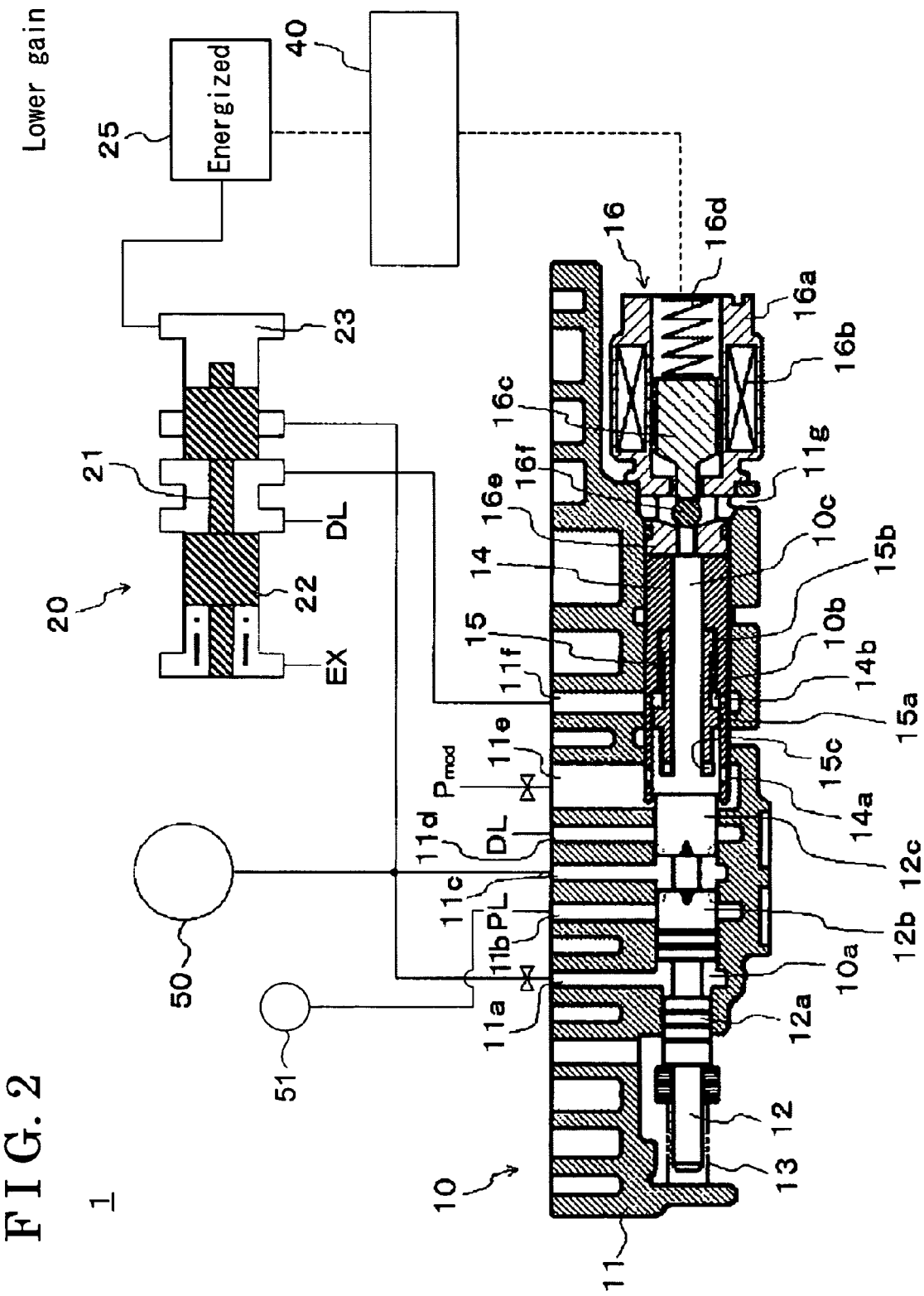
FIG. 2 is a hydraulic circuit diagram schematically showing a structure of the hydraulic control apparatus for the automatic transmission in a lower gain state according to the first embodiment of the present invention.
Figure 3:
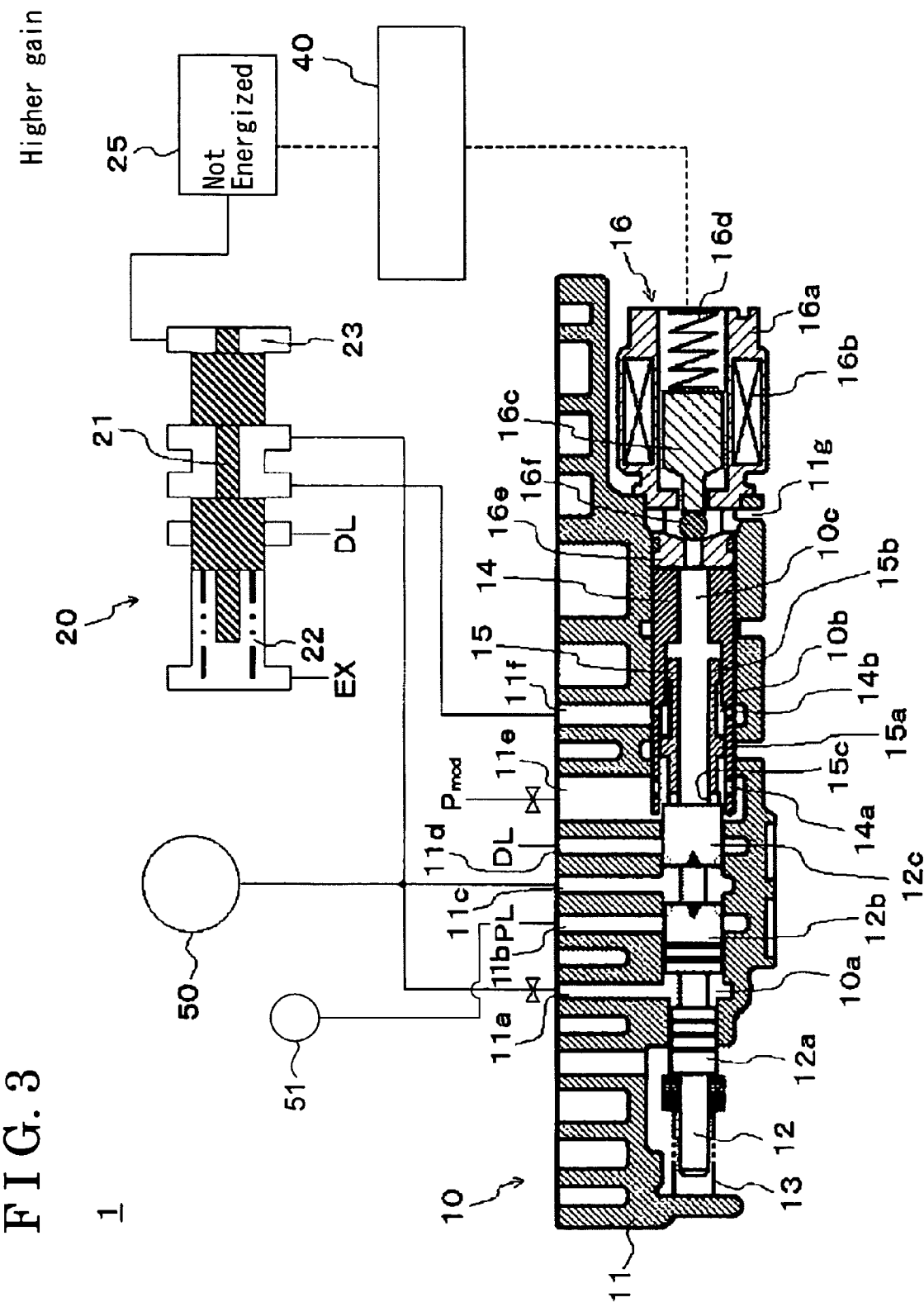
FIG. 3 is a hydraulic circuit diagram schematically showing a structure of the hydraulic control apparatus for the automatic transmission in a higher gain state according to the first embodiment of the present invention.

The feedback hydraulic chamber 10a is for providing a feedback control to keep a predetermined level of the controlled hydraulic pressure. When the controlled hydraulic pressure becomes higher than a predetermined level of the hydraulic pressure, the pressure in the feedback hydraulic chamber 10a increases, the spool 12 is pushed towards the right in a state shown in FIG. 2 (i.e., in a biasing direction of the spring 13), and the pressure is released from the exhaust port 11d to reduce the controlled hydraulic pressure. In the meantime, when the controlled hydraulic pressure becomes lower than the predetermined level of hydraulic pressure, the pressure in the feedback hydraulic chamber 10a is declined, the force applied by the pressure towards the right in FIG. 2 is reduced, the exhaust port 11d is closed, the input port 11b is opened, and the line pressure PL is inputted to increase the level of the controlled hydraulic pressure. By selectively opening and closing the input port 11b and the exhaust port 11d, the controlled hydraulic pressure is regulated to be the predetermined level. FIG. 1 shows an assembled state, or a state where pilot pressure in the pilot pressure chamber 10c does not affect the spool 12. FIGS. 2-3 shows a state where the pilot pressure is applied to the spool 12 and regulates the controlled hydraulic pressure. According to the first embodiment of the present invention, the pressure is regulated by adjusting an opening degree of notches provided on the lands 12b, 12c of the spool 12, which notches establish the communication between the input port 11b and the exhaust port 11d. The level of the pressure in the plunger hydraulic chamber 10b increases when the controlled hydraulic pressure becomes higher than the predetermined level and when the communication between the output port 11c and the second feedback port 11f are established through the shift valve means 20. As shown in FIG. 3, the increased pressure in the plunger hydraulic chamber 10b pushes the spool 12 via the plunger 15 to increase the controlled hydraulic pressure against the biasing force of the spring 13. The pilot pressure chamber 10c is for controlling the controlled hydraulic pressure to be a predetermined level of pressure. When the pilot pressure increases to be higher than the predetermined level, the pressure in the pilot pressure chamber 10c increases to apply the pressure to the land 12c of the spool 12.

The spool 12 is a valve body which includes plural lands 12a, 12b, 12c. The spool 12 is positioned in the valve body 11 to be slidable therein, and is biased towards the solenoid valve 16 by means of the spring 13 which is provided at a first end of the spool 12. The pilot pressure in the pilot pressure chamber 10c regulated by the solenoid valve 16 is applied to the land 12c so that the spool 12 is pushed against the biasing force of the spring 13.

A diameter of the first land 12a is smaller than a diameter of the second land 12b, and the controlled hydraulic pressure inputted into the feedback hydraulic chamber 10a is received by the difference of dimensions between the first land 12a and the second land 12b. A diameter of the third land 12c is the same with the diameter of the second land 12b. An end of the third land 12b is housed in an internal periphery of the sleeve 14 to receive the pilot pressure in the pilot pressure chamber 10c regulated by the solenoid valve 16. The second land 12b and the third land 12c are configured to selectively establish the communication between the line pressure input port 11b and the output port 11c, or to selectively establish the communication between the output port 11c and the exhaust port 11d in accordance with the position of the spool 12.

The sleeve 14 is a cylindrical member having a hollow, and is provided at a second end of the spool 12, which is the opposite end relative to the first end provided with the spring 13 (i.e., the sleeve 14 is provided at an opposite side of the spring 13 relative to the spool 12). The end of third land 12c is inserted into the internal periphery of a first end of the sleeve 14. An internal peripheral surface of the sleeve 14 includes two stepped portions which support the plunger 15 so as to be slidable therein. The stepped portions include a first stepped surface which corresponds to a diameter of a first land portion 15a and a second stepped surface which is smaller than the diameter of the first stepped surface and corresponds to a diameter of a second land portion 15b. There is a clearance between the first stepped surface of the internal periphery surface of the sleeve 14 and an external peripheral surface of the third land 12c. A space in the internal periphery of the sleeve 14 serves as the pilot pressure chamber 10c except for a space used for the plunger hydraulic chamber 10b. The sleeve 14 includes a passage 14a, which is in communication with the pilot pressure chamber 10c via the passage 15c of the plunger 15, at a position corresponding to the modulator pressure input port 11e. The sleeve 14 includes a passage 14b, which is in communication with the plunger hydraulic pressure chamber 10b, at a position corresponding to the second feedback port 11f. The sleeve 14 is fluid-tightly inserted into the valve body 11 to construct the hydraulic circuit, and is lidded therein by the solenoid valve 16 attached on an end of the sleeve 14. The sleeve 14 is detachable and replaceable as well as the plunger 15.

The plunger 15 is provided to be slidable inside of the sleeve 14 at the internal periphery thereof. The plunger 15 includes the first land portion 15a at a position corresponding to the first stepped surface of the sleeve 14. The plunger 15 includes the second land portion 15b having the diameter smaller than the diameter of the first land portion 15a at a position corresponding to the second stepped surface of the sleeve 14. The plunger 15 includes the passage 15c, which is in communication with the feedback hydraulic chamber 10a through the passage 14a of the sleeve 14, at a position in the vicinity of a contact portion of the third land 12c of the spool 12. The plunger hydraulic chamber 10b which is separated from the pilot pressure chamber 10c is arranged between the plunger 15 and the sleeve 14 and between the first land portion 15a and the second land portion 15b. When the pressure in the plunger hydraulic chamber 10b rises, the plunger 15 moves towards the left in FIG. 1 to push the spool 12 towards the left as shown in FIG. 3 accordingly. A hole which serves as a passage to establish the communication between the modulator pressure input port 11e and the pilot pressure chamber 10c is formed at the internal periphery of the plunger 15, which a hole also serves as a part of the pilot pressure chamber 10c.

The solenoid valve 16 is applied to regulate, or modulate the modulator pressure $P_{mod}$, which is supplied to the modulator pressure input port 11e from a modulator valve through an orifice and introduced to the pilot pressure chamber 10c, as a pilot pressure in the pilot pressure chamber 10c in accordance with an electric signal from the controller 40 to apply the regulated pressure to the spool 12. In this embodiment, for example, in the solenoid valve 16, a movable core 16c is provided to be slidable at an internal wall of a housing 16a relative to a cylindrical coil 16b mounted on the housing 16a. The movable core 16c is biased towards a valve seat 16e by means of a spring 16d. A ball-shaped valve body 16f is provided between the movable core 16c and the valve seat 16e. With the construction of the solenoid valve 16, when the cylindrical coil 16b is energized, a clearance between the valve seat 16e and the valve body 16f is adjusted in accordance with a difference of the force between the biasing force of the spring 16d and a resultant of the attraction force by the cylindrical coil 16b to attract the movable core 16c and the force which is applied to the ball-shaped valve body 16f by the hydraulic pressure in the pilot pressure chamber 10c. Accordingly, the pressurized oil in the pilot pressure chamber 10c is exhausted from the exhaust port 11g through a hole of the valve seat 16e, the clearance between the valve seat 16e and the valve body 16f to regulate the pilot pressure in accordance with the flowing current at the cylindrical coil 16b. When the cylindrical coil 16b is not energized, the valve body 16f is biased by the spring 16d via the movable core 16c, the valve body 16f closes the hole of the valve seat 16e, and the pressurized oil in the pilot pressure chamber 10c is not drained to the exhaust port 11g. The solenoid valve 16 is a normal-high type linear solenoid valve which does not exhaust the oil to reduce the level of the pressure when the coil is not energized and exhausts the oil to regulate the pilot pressure to be reduced as the level of the flowing current increases when the coil is energized. A normal-low type linear solenoid valve which exhausts the oil to reduce the level of the pressure when the coil is not energized may be applied as the solenoid valve 16. Further, a duty-type solenoid valve which regulates the pilot pressure in the pilot pressure chamber 10c by controlling an opening/closing ratio of a valve per unit of time may be applied as the solenoid valve 16.

The shift valve means 20 switches hydraulic paths which establish the communication between the output port 11c and the second feedback port 11f. The shift valve means 20 includes a spool 21, a spring 22, a hydraulic chamber 23, and an on/off solenoid valve 25. The spool 21 is supported by a valve body so as to be slidable therein. The spring 22 biases the spool 21 towards the hydraulic chamber 23. The hydraulic chamber 23 moves the spool 21 towards the spring 22 when the oil is inputted from the on/off solenoid valve 25 to increase the pressure to establish the communication between the second feedback port 11f and the exhaust port DL. The hydraulic chamber 23 moves the spool 21 towards the hydraulic chamber 23, when the oil is not inputted from the on/off solenoid valve 25 to increase the pressure, to establish the communication between the second feedback port 11f and the output port 11c.

The on/off solenoid valve 25 changes an operational state by changing a level of the hydraulic pressure supplied to the hydraulic chamber 23 in accordance with the states whether the coil is energized or not energized. A normal low (NL) type solenoid valve which supplies the hydraulic pressure to the hydraulic chamber 23 when the coil is energized and which does not supply the hydraulic pressure to the hydraulic chamber 23 is applied as the on/off solenoid valve 25. A normal-high (NH) type solenoid valve which supplies the hydraulic pressure to the hydraulic chamber 23 when the coil is not energized and which does not supply the hydraulic pressure to the hydraulic chamber when the coil is energized may also be applied as the on/off solenoid valve 25. Whether energizing the on/off solenoid valve 25 is controlled by the controller 40.

The controller 40 controls an energizing state of the solenoid valve 16 on the basis of the predetermined information from the vehicle which is equipped with the automatic transmission and controls whether energizing the on/off solenoid valve 25.

The engagement element 50 is a engagement element such as a clutch or a brake which is provided in an automatic transmission, and is connected to the output port 11c of the valve body 11 through a hydraulic path.

An operation of the hydraulic control apparatus for the automatic transmission according to the first embodiment will be explained with reference to FIGS. 2-7.

First, a lower gain state of the hydraulic control apparatus for the automatic transmission will be explained as follows. As shown in FIG. 2, when the on/off solenoid valve 25 is energized and in the lower gain state, because the controlled hydraulic pressure is not inputted into the plunger hydraulic chamber 10b, the spool 12 and the plunger 15 are separated from each other by the pilot pressure in the pilot pressure chamber 10c. In the lower gain state, the level of the controlled hydraulic pressure outputted from the output port 11c to the engagement element 50 is determined on the basis of the spring load of the spring 13, the controlled hydraulic pressure in the feedback hydraulic chamber 10a, and the pilot pressure in the pilot pressure chamber 10c.

Figure 4:
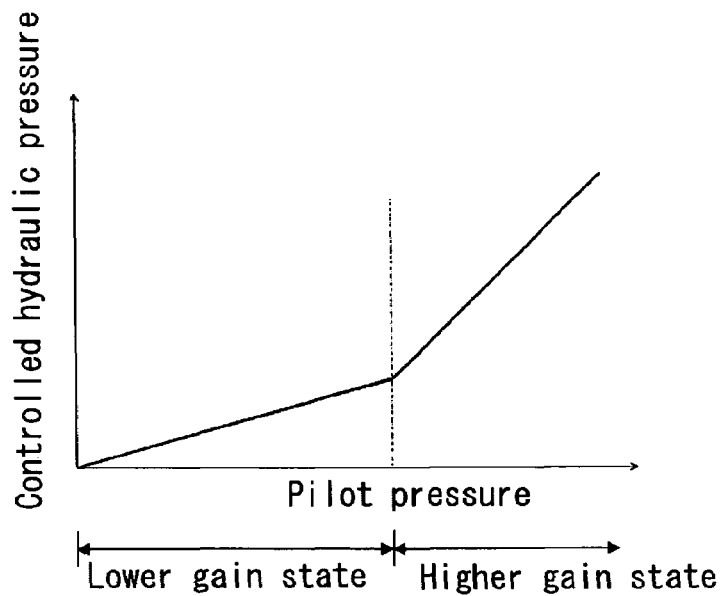
FIG. 4 is a graph schematically showing characteristics of controlled hydraulic pressure outputted from a control valve unit of the hydraulic control apparatus for the automatic transmission according to the first embodiment of the present invention.
Figure 5:
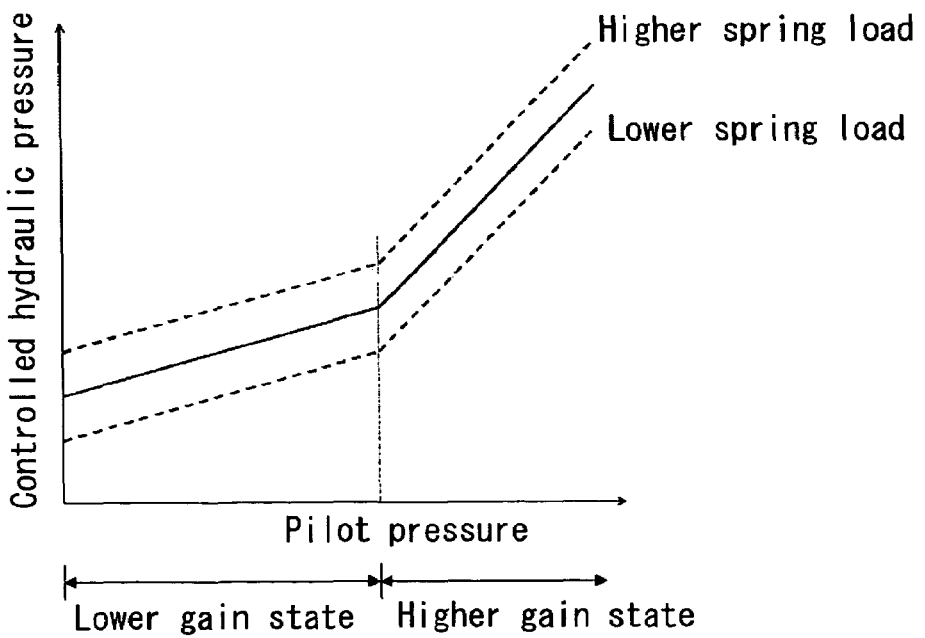
FIG. 5 is a graph schematically showing characteristics of controlled hydraulic pressure outputted from the control valve unit of the hydraulic control apparatus for the automatic transmission and characteristics when spring load is varied according to the first embodiment of the present invention.
Figure 6:
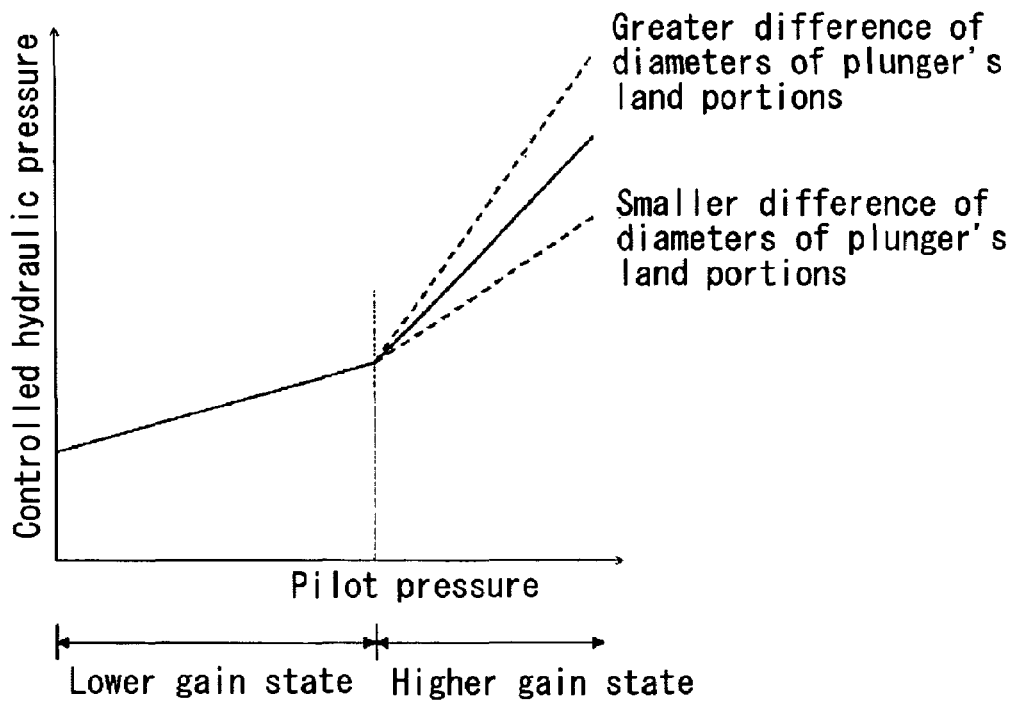
FIG. 6 is a graph schematically showing characteristics of controlled hydraulic pressure outputted from the control valve unit of the hydraulic control apparatus for the automatic transmission and characteristics when a size of land portions of a plunger is changed according to the first embodiment of the present invention.
Figure 7:
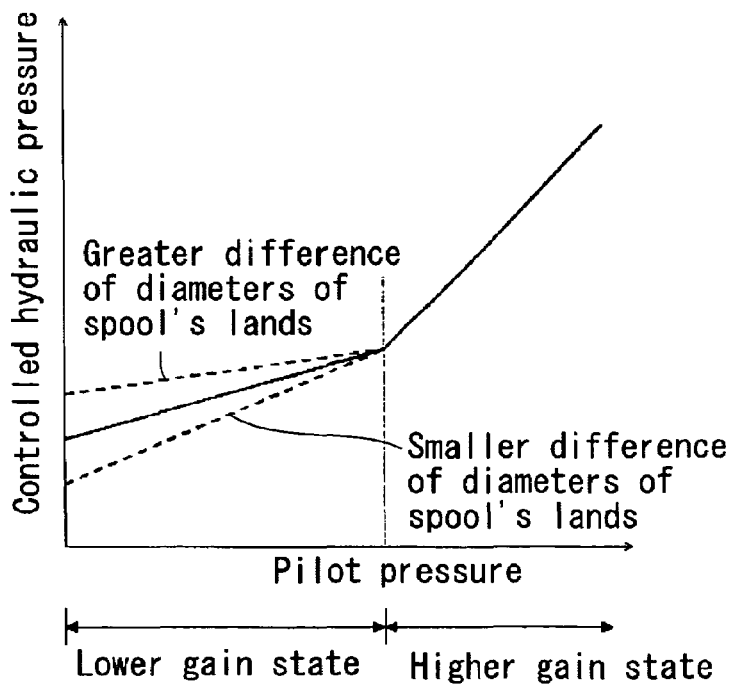
FIG. 7 is a graph schematically showing characteristics of controlled hydraulic pressure outputted from the control valve unit of the hydraulic control apparatus for the automatic transmission and characteristics when a size of land portions of a spool is changed according to the first embodiment of the present invention.
Figure 8:
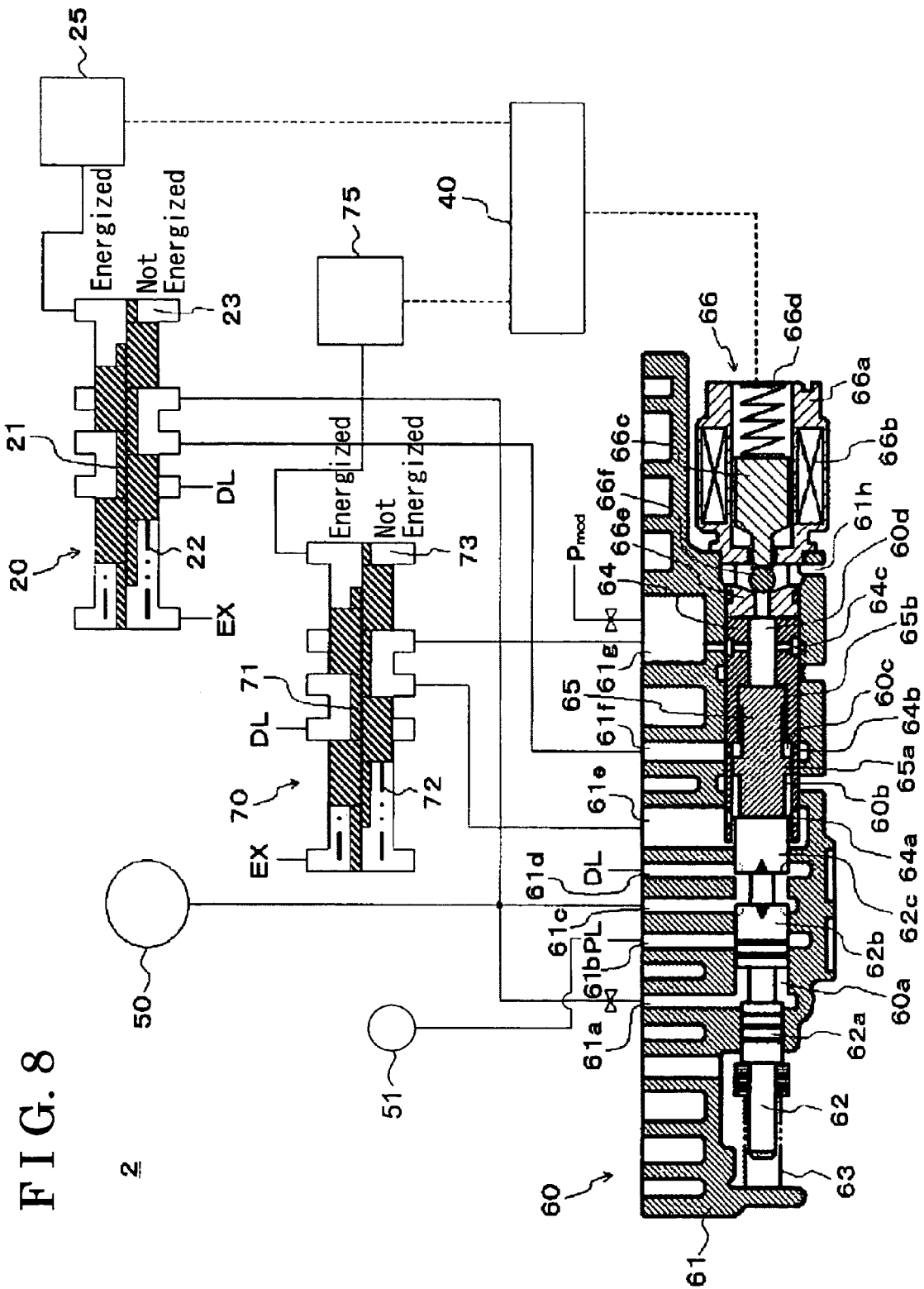
FIG. 8 is a hydraulic circuit diagram schematically showing a structure of a hydraulic control apparatus for an automatic transmission, which is in an assembled state, or in a state where pilot pressure is not applied to a spool according to a second embodiment of the present invention.

Second, a higher gain state of the hydraulic control apparatus for the automatic transmission will be explained as follows. As shown in FIG. 3, when the on/off solenoid valve 25 is not energized and in a higher gain state, the controlled hydraulic pressure is inputted into the plunger hydraulic chamber 10b. When the level of the controlled hydraulic pressure in the plunger hydraulic chamber 10b is increased to be greater than the pilot pressure in the pilot pressure chamber 10c, because the plunger 15 pushes the spool 12 against the biasing force of the spring 13, the gain of the controlled hydraulic pressure outputted from the output port 11c increases. For example, as shown in FIG. 4, when the pilot pressure in the pilot pressure chamber 10c, which is regulated by the solenoid valve 16, exceeds a predetermined level of the hydraulic pressure, the lower gain state is switched to be the higher gain state. In the higher gain state, the level of the controlled hydraulic pressure outputted from the output port 11c to the engagement element 50 is determined on the basis of the spring load of the spring 13, the hydraulic pressure in the feedback hydraulic chamber 10a, the pilot pressure in the pilot pressure chamber 10c, and the hydraulic pressure in the plunger hydraulic chamber 10b. Namely, because the pressured force of the pilot pressure in the pilot pressure chamber 10c is assisted by the application of the controlled hydraulic pressure in the plunger hydraulic chamber 10b in the higher gain state, the gradient of the controlled hydraulic pressure outputted from the output port 11c to the engagement element 50 relative to the pilot pressure in the pilot pressure chamber 10c in the higher gain state is steeper than the gradient of the controlled hydraulic pressure outputted from the output port 11c to the engagement element 50 relative to the pilot pressure in the pilot pressure chamber 10c in the lower gain state (shown in FIG. 4).

Changing the level of the spring load of the spring 13 can vary the level of the controlled hydraulic pressure outputted from the output port 11c to the engagement element 50. By increasing the spring load, the level of the outputted controlled hydraulic pressure shifts upward (i.e., indicated with a dotted line in FIG. 5) relative to a solid line. By decreasing the spring load, the level of the outputted controlled hydraulic pressure shifts downward (i.e., indicated with a dotted line in FIG. 5) relative to the solid line.

Changing the diameters of the first land portion 15a or the second land portion 15b of the plunger 15 can vary the level of the controlled hydraulic pressure outputted from the output port 11c to the engagement element 50. By determining the diameter of the second land portion 15b to be smaller than the diameter of the first land portion 15a and by determining the difference between the diameter of the first land portion 15a and the diameter of the second land portion 15b to be greater, the gradient of the controlled hydraulic pressure outputted from the output port 11c to the engagement element 50 relative to the pilot pressure in the pilot pressure chamber 10 becomes generally steeper. On the other hand, by determining the diameter of the second land portion 15b to be smaller than the diameter of the first land portion 15a and by determining the difference between the diameter of the first land portion 15 and the diameter of the second land portion 15b to be smaller, the gradient of the controlled hydraulic pressure outputted from the output port 11c to the engagement element 50 relative to the pilot pressure in the pilot pressure chamber 10c becomes generally more moderate (shown in FIG. 6).

Although the valve body 11 has to be replaced, the controlled hydraulic pressure outputted from the output port 11c to the engagement element 50 can be varied by changing the diameters of the first land 12a and the second land 12b of the spool 12. By determining the diameter of the second land 12b to be greater than the diameter of the first and 12a and determining the difference of the diameters between the first land 12a and the second land 12b to be greater, the gradient of the controlled hydraulic pressure outputted from the output port 11c to the engagement element 50 relative to the pilot pressure in the pilot pressure chamber 10c becomes generally more moderate. On the other hand, by determining the diameter of the second land 12b to be greater than the diameter of the first land 12a and determining the difference of the diameters between the first land 12a and the second land 12b to be smaller, the gradient of the controlled hydraulic pressure outputted from the output port 11c to the engagement element 50 relative to the pilot pressure in the pilot pressure chamber 10c becomes generally steeper (shown in FIG. 7). A point for switching from the lower gain state to the higher gain state in characteristic diagrams (shown in FIGS. 4-7) of the controlled hydraulic pressure relative to the pilot pressure can be determined by selectively determining each of the diameters of the first and second lands 12a, 12b of the spool, the diameter of the plunger 15, and the spring load of the spring 13. In the hydraulic pressure characteristic diagram in this embodiment, the controlled hydraulic pressure is not changed even when the hydraulic pressure is applied to the plunger 15 from the shift valve means 20 in the pilot pressure which shows the lower gain state.

According to the first embodiment, without replacing the valve body 11, various gain characteristics (i.e., the gradient of the controlled hydraulic pressure outputted from the output port 11c to the engagement element 50 relative to the pilot pressure in the pilot pressure chamber 10c) can be obtained only by changing the configuration of the lad portions 15a, 15b of the plunger 15 (i.e., the size of the stepped portions of the sleeve 14).

A second embodiment of the present invention will be explained as follows referring to FIGS. 8-14.

A hydraulic control apparatus 2 for an automatic transmission according to the second embodiment of the present invention includes a valve body 61, a sleeve 64, a plunger 65, and an input oil passage of the modulator pressure which have constructions different from the hydraulic control apparatus 1 according to the first embodiment of the present invention. Further, the hydraulic control apparatus 2 includes a second shift valve means 70 (i.e., serving as a second switching device) additionally to the construction of the first embodiment. The hydraulic control apparatus 2 for the automatic transmission includes a control valve unit 60, a first shift valve means 20, the second shift valve means 70, a controller 40, and a engagement element 50.

The control valve unit 60 is configured to affect a spool 62 provided in the valve body 61 by the pilot pressure modulated by a solenoid valve 66 (i.e., to apply the pilot pressure, which is regulated by a solenoid valve 66, to a spool 62 provided in the valve body 61), to regulate the line pressure PL introduced from an oil pump 51 which serves as a hydraulic pressure source as the controlled hydraulic pressure, and to output the regulated controlled hydraulic pressure to the engagement element 50. The control valve unit 60 includes the valve body 61 which houses the spool 62, a spring 63, the sleeve 64, the plunger 65, and the solenoid valve 66.

The valve body 61 houses the spool 62 and the sleeve 64, and serves as a member to construct a hydraulic circuit. In the valve body 61, the solenoid valve 66 is attached at a first end side of the spool 62 in an axial direction and a second end of the spool in the axial direction is biased by means of the spring 63. In the valve body 61, a diameter of a portion which supports a first land 62a of the spool 62 is smaller than a diameter of portions which support a second land 62b and a third land 62c of the spool 62 respectively. Further, in the valve body 61, the diameters of the portions which support the second land 62b and the third land 62c of the spool 62 are smaller than a diameter of a portion which supports the sleeve 64. The valve body 61 includes a first feedback port 61a, a line pressure input port 61b, an output port 61c, an exhaust port 61d, a second modulator pressure input port 61e, a second feedback port 61f, a first modulator pressure input port 61g, and an exhaust port 61h in order to be positioned closer to the spring 63.

The first feedback port 61a feeds back the controlled hydraulic pressure from the output port 61c to a feedback hydraulic chamber 60a. The controlled hydraulic pressure from the output port 61c is inputted into the feedback hydraulic chamber 60a through an orifice. The line pressure PL from the oil pump 51 is introduced into the line pressure input port 61b. The output port 61c outputs the controlled hydraulic pressure, which is modulated from the line pressure PL, to the engagement element 50 when engaging the engagement element 50. The exhaust port 61d exhausts pressurized oil when regulating the hydraulic pressure. The second modulator pressure input port 61e is a port for inputting the pilot pressure in the first modulator pressure input port 61g to the second pilot pressure chamber 60b through the second shift valve means 70 and a passage (i.e., hole) 64a. The second feedback port 61f feeds back the controlled hydraulic pressure to the plunger hydraulic chamber 60c through a passage (i.e., hole) 64b when the oil is inputted from the first shift valve means 20 to increase the hydraulic pressure. The first modulator pressure input port 61g is a port used to input the pressurized oil introduced from a modulator valve through an orifice to the first pilot pressure chamber 60d through a passage (i.e. hole) 64c. The exhaust port 61h exhausts the pressurized oil from the solenoid valve 66 as necessity arises when regulating the pressurized oil, which is introduced into the first pilot pressure chamber 60d as the pilot pressure, by the solenoid valve 66.

The feedback hydraulic chamber 60a is for providing a feedback control in order to maintain the controlled hydraulic pressure to be a predetermined level of the pressure. In the operational state shown in FIG. 9, when the controlled hydraulic pressure increases to be higher than the predetermined level of the hydraulic pressure, the pressure in the feedback hydraulic chamber 60a increases, and the spool 62 is pushed towards the right in FIG. 9 to release the pressure from the exhaust port 61d to reduce the controlled hydraulic pressure. The second pilot pressure chamber 60b is used for providing a feedback control in order to maintain the controlled hydraulic pressure to be the predetermined level when the communication between the first modulator pressure input port 61g and the second modulator pressure input port 61e is established via the second shift valve means 70. When the first modulator pressure input port 61g and the second modulator pressure input port 61e are in communication through the second shift valve means 70, the pilot pressure introduced into the second pilot chamber 60b is applied to the land 62c of the spool 62 to push and move the land 62c towards the left in FIG. 9, and thus the pressure is introduced from the input port 61b to increase the controlled hydraulic pressure. The plunger hydraulic chamber 60c is used for providing a feedback control in order to maintain the controlled hydraulic pressure to be a predetermined level when the communication between the output port 61c and the second feedback port 61f is established via the first shift valve means 20. When the output port 61c and the second feedback port 61f are in communication through the first shift valve means 20, the controlled hydraulic pressure is introduced into the plunger hydraulic chamber 60c, and the spool 62 is pushed towards the left in FIG. 9 via the plunger 65 to increase the controlled hydraulic pressure. The first pilot pressure chamber 60d is used for controlling the hydraulic pressure to be the predetermined level.

The spool 62 is a valve body which includes plural lands 62a, 62b, 62c. The spool 62 is positioned in the valve body 61 to be slidable therein and is biased towards the right in FIG. 9 by the spring 63. The spool 62 is moved to the right or the left in FIG. 9 in accordance with the level of the pilot pressure in the first pilot pressure regulated by the solenoid valve 66 via the plunger 65.

A diameter of the first land 62a is smaller than a diameter of the second land 62b. The controlled hydraulic pressure inputted into the feedback hydraulic chamber 60a is received by the first land 62a and the second land 62b which have different dimensions. A diameter of the third land 62c is the same with the diameter of the second land 62b. A part of the third land 62c is housed in the sleeve 64 to be in contact therewith to receive the pilot pressure inputted into the second pilot pressure chamber 60b. The second land 62b and the third land 62c selectively establishes the communication between the line pressure input port 61b and the output port 61c or establishes the communication between the output port 61c and the exhaust port 61d in accordance with the positioning of the spool 62.

The sleeve 64 is a cylindrical member having a hollow and is provided at the first end side of the spool 62, which is the opposite end to the end provided with the spring 63. The third land 62c is fitted to an internal periphery of a first end of the sleeve 64. An internal periphery surface of the sleeve 64 includes two stepped portions which support the plunger 65 so as to be slidable therein. The stepped portions includes a first stepped surface which corresponds to a diameter of the first land portion 65a of the plunger 65 and a second stepped surface which corresponds to a diameter of a second land portion 65b of the plunger 65 and smaller than the diameter of the first stepped surface. There is a clearance between the first stepped surface at an internal surface of the sleeve and an external peripheral surface of the third land 62c of the spool 62. A space in an internal periphery of the sleeve 64 serves as the first pilot pressure chamber 60d except for the space used for the second pilot pressure chamber 60b and the plunger hydraulic chamber 60c. The sleeve 64 includes a passage 64a, which is in communication with the second pilot pressure chamber 60b, at a position corresponding to the second modulator pressure input port 61e. The sleeve 64 includes a passage 64b, which is in communication with the plunger hydraulic chamber 60c, at a position corresponding to the second feedback port 61f. The sleeve 64 includes a passage 64c, which is in communication with the first pilot pressure chamber 60d, at a position corresponding to the first modulator pressure input port 61g.

The plunger 65 is provided in the sleeve 64 so as to slide on an internal peripheral surface of the sleeve 64. The plunger 65 does not include a hole or bore penetrating through thereof such as the plunger 15 according to the first embodiment of the present invention. The plunger 65 includes the first land portion 65a at a position corresponding to the first stepped surface of the sleeve 64. The plunger 65 includes the second land portion 65b whose diameter is smaller than the diameter of the first land portion 65a at a position corresponding to the second stepped surface of the sleeve 64. The plunger hydraulic chamber 60c is provided between the plunger 65 and the sleeve 64, and between the first land portion 65a and the second land portion 65b. When the pressurized oil is introduced into the plunger hydraulic chamber 60c, the plunger moves towards the left in FIG. 10 and pushes the spool 62 to the left in FIG. 10 accordingly.

The solenoid valve 66 regulates modulator pressure $P_{mod}$ in the first pilot pressure chamber 60d, which is supplied to the first modulator pressure input port 61g from a modulator valve through an orifice and is introduced into the first pilot pressure chamber 60d, as pilot pressure in accordance with an electric signal from the controller 40 so as to apply the regulated hydraulic pressure to the spool 62. In this example, in the solenoid valve 66, a movable core 66c is arranged at an internal periphery side of a cylindrical coil 66b mounted on a housing 66a so as to slide therein, the movable core 66c is biased towards a valve seat 66e by means of a spring 66d, and a ball-shaped valve body 66f is provided between the movable core 66c and the valve seat 66e. With the construction of the solenoid valve 66, when the cylindrical coil 66b is energized, a clearance between the valve seat 66e and the valve body 66f is adjusted in accordance with a difference of the force between the biasing force of the spring 66d and a resultant of the attraction force by the cylindrical coil 66b to attract the movable core 66c and the force which is applied to the ball-shaped valve body 66f by the hydraulic pressure in the first pilot pressure chamber 60d. Accordingly, the pressurized oil in the first pilot pressure chamber 60d is exhausted from the exhaust port 61h through a hole of the valve seat 66e, and the clearance between the valve seat 66e and the valve body 66f to regulate the pilot pressure in accordance with the flowing current at the cylindrical coil 66b. When the cylindrical coil 66b is not energized, the valve body 66f is biased by the spring 66d via the movable core 66c, the valve body 66f closes the hole of the valve seat 66e, and the pressurized oil in the first pilot pressure chamber 60d is not drained to the exhaust port 61h. The solenoid valve 66 is a normal-high type linear solenoid valve which does not exhaust the oil to reduce the level of the pressure when the coil is not energized and exhausts the oil to regulate the pilot pressure to be reduced as the level of the flowing current increases when the coil is energized. A normal-low type linear solenoid valve which exhausts the oil to reduce the level of the pressure when the coil is not energized may be applied as the solenoid valve 66. Further, a duty-type solenoid valve which regulates the pilot pressure in the first pilot pressure chamber 60d by controlling an opening/closing ratio of a valve per unit of time may be applied as the solenoid valve 66.

The first shift valve means 20 switches a hydraulic passage which is selectively in communication with the plunger hydraulic chamber 60c through the second feedback port 61f and the passage 64b of the sleeve 64. The first shift valve means 20 includes a spool 21, a spring 22, a hydraulic chamber 23, and a first on/off solenoid valve 25. The spool 21 is supported in a valve body so as to slide therein. The spring 22 biases the spool 21 towards the hydraulic chamber 23. The hydraulic chamber 23 moves the spool 21 towards the spring 22 when the hydraulic pressure is inputted into the hydraulic chamber 23 from the solenoid valve 25 to establish the communication between the second feedback port 61f and the exhaust port DL. When the hydraulic pressure is not inputted into the hydraulic chamber 23 from the first on/off solenoid valve 25, the spool 21 is moved towards the hydraulic chamber 23 to establish the communication between the second feedback port 61f and the output port 61c.

The first on/off solenoid valve 25 switches the operational state by switching the hydraulic pressure supplied to the hydraulic chamber 23 in accordance with whether the first on/off solenoid valve 25 is energized or not energized. A normal-low (NL) type solenoid valve, which supplies hydraulic pressure to the hydraulic chamber 23 when energized and does not supply the hydraulic pressure to the hydraulic chamber 23 when not energized, is applied as the first on/off solenoid valve 25. A normal-high (NH) type solenoid valve, which supplies the hydraulic pressure to the hydraulic chamber 23 when not energized and does not supply the hydraulic pressure to the hydraulic chamber 23 when energized, may be applied as the first on/off solenoid valve 25. Whether energizing the first on/off solenoid valve 25 or not is controlled by the controller 40.

The second shift valve means 70 switches a passage which is selectively in communication with the second modulator pressure input port 61e. The second shift valve means 70 includes a spool 71, a spring 72, a hydraulic chamber 73, and a second on/off solenoid valve 75. The spool 71 is supported in a valve body so as to slide therein. The spring 72 biases the spool 71 towards the hydraulic chamber 73. The hydraulic chamber 73 moves the spool 71 towards the spring 72 when the hydraulic pressure is inputted thereto from the second on/off solenoid valve 75 to establish the communication between the second modulator pressure input port 61e and the exhaust port DL. When the hydraulic pressure is not inputted into the hydraulic chamber 73 from the second on/off solenoid valve 75, the spool 71 is moved towards the hydraulic chamber 73 to establish the communication between the second modulator pressure input port 61e and the first modulator pressure input port 61g.

The second on/off solenoid valve 75 switches operational states by changing the level of the hydraulic pressure supplied to the hydraulic chamber 73 in accordance with whether energized or not energized. A normal-low (NL) type solenoid valve, which supplies the hydraulic pressure to the hydraulic chamber 73 in an energized state and does not supply the hydraulic pressure to the hydraulic chamber 73 in a non-energized state, is applied as the second on/off solenoid valve 75. A normal-high (NH) type solenoid valve, which supplies the hydraulic pressure to the hydraulic chamber 73 when not energized and does not supply the hydraulic pressure to the hydraulic chamber 73 when energized, may be applied as the second on/off solenoid valve 75. Whether energizing or not energizing the second on/off solenoid valve 75 is controlled by the controller 40.

The controller 40 controls energizing state of the solenoid valve 66, controls whether energizing the first on/off solenoid valve 25 or not, and controls whether energizing the second on/off solenoid valve 75 or not on the basis of the predetermined information from the vehicle.

A engagement element 50 is a engagement element such as a clutch and a brake provided in an automatic transmission, and is connected to the output port 61c of the valve body 61 through a passage.

An operation of the hydraulic control apparatus for the automatic transmission according to the second embodiment will be explained as follows referring to FIGS. 9-14.

Figure 9:
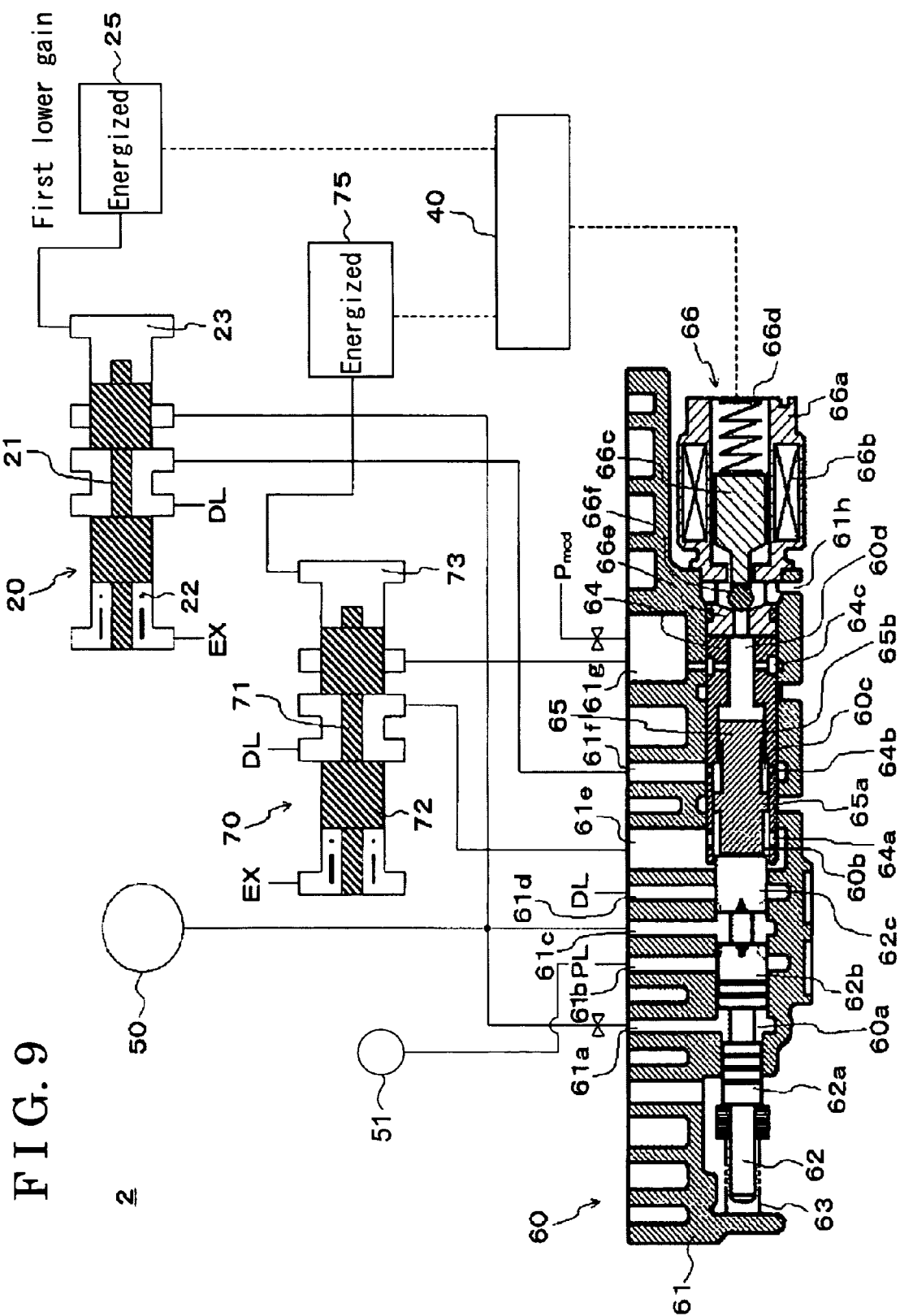
FIG. 9 is a hydraulic circuit diagram schematically showing a structure of the hydraulic control apparatus for the automatic transmission in a first lower gain state according to the second embodiment of the present invention.

First, a first lower gain state of the hydraulic control apparatus for the automatic transmission will be explained as follows. As shown in FIG. 9, in the first lower gain state where the first on/off solenoid valve 25 is energized and the second on/off solenoid valve 75 is energized, because the pilot pressure is inputted into the first pilot pressure chamber 60d and the hydraulic pressure is not inputted into the second pilot pressure chamber 60b and the plunger hydraulic chamber 60c, the plunger 65 moves towards the spool 62 by the pilot pressure in the first pilot pressure chamber 60d so that the plunger 65 pushes the spool 62. In the first lower gain state, the level of the controlled hydraulic pressure outputted from the output port 61c to the engagement element 50 is determined by the spring load of the spring 63, the controlled hydraulic pressure in the feedback hydraulic chamber 60a, and the pilot pressure in the first pilot pressure chamber 60d.

Figure 10:
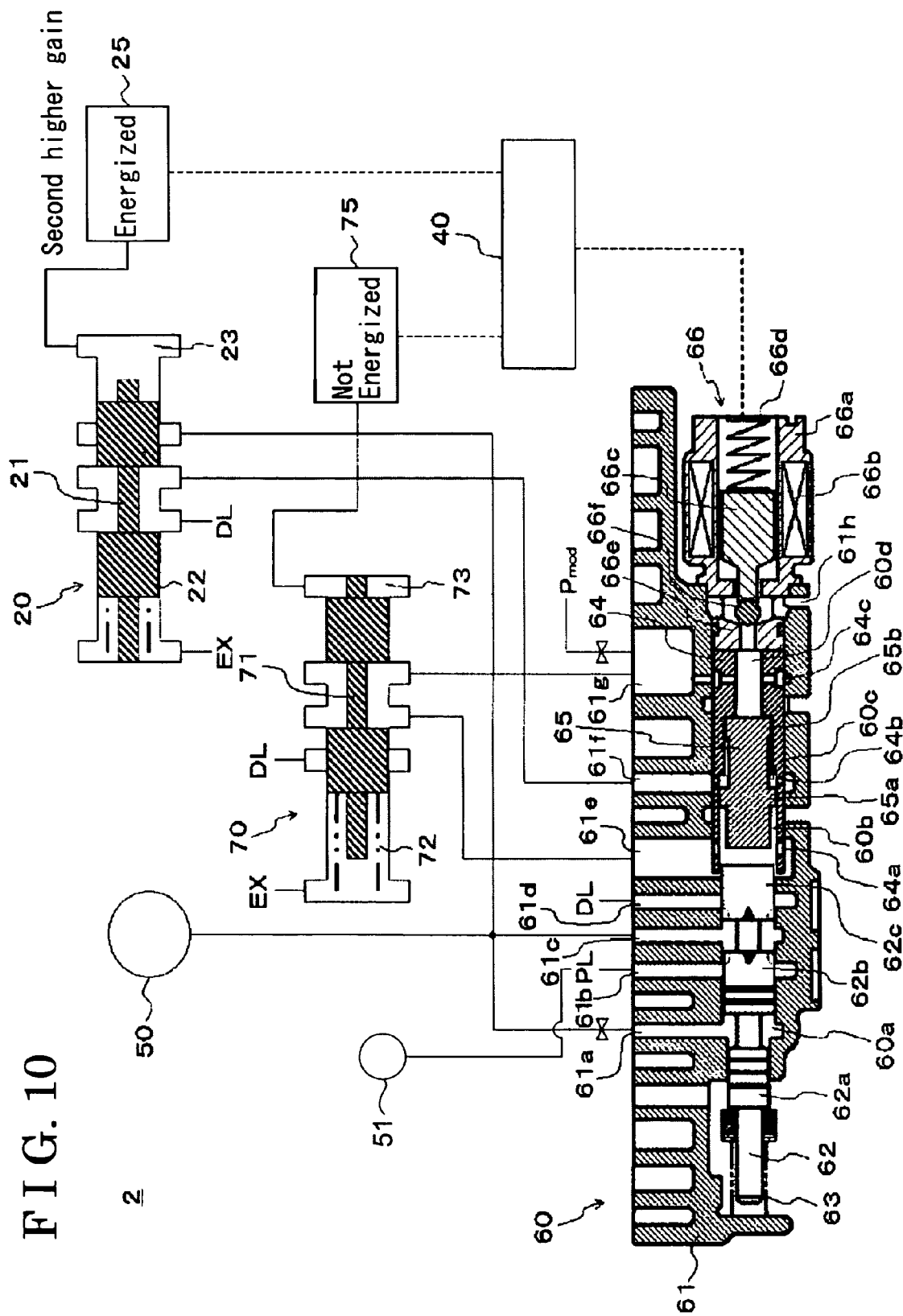
FIG. 10 is a hydraulic circuit diagram schematically showing a structure of the hydraulic control apparatus for the automatic transmission in a second lower gain state according to the second embodiment of the present invention.

Second, a second lower gain state of the hydraulic control apparatus for the automatic transmission will be explained. As shown in FIG. 10, in the first lower gain state where the first on/off solenoid valve 25 is energized and the second on/off solenoid valve 75 is not energized, because the pilot pressure is inputted into the first pilot pressure chamber 60d and the second pilot pressure chamber 60b and the hydraulic pressure is not inputted into the plunger hydraulic chamber 60c, the spool 62 and the plunger 65 are separated by the pilot pressure in the second pilot pressure chamber 60b. In the second lower gain state, the level of the controlled hydraulic pressure outputted from the output port 61c to the engagement element 50 is determined by the spring load of the spring 63, the controlled hydraulic pressure in the feedback hydraulic chamber 60a, the pilot pressure in the first pilot pressure chamber 60d, and the pilot pressure in the second pilot pressure chamber 60b.

Figure 11:
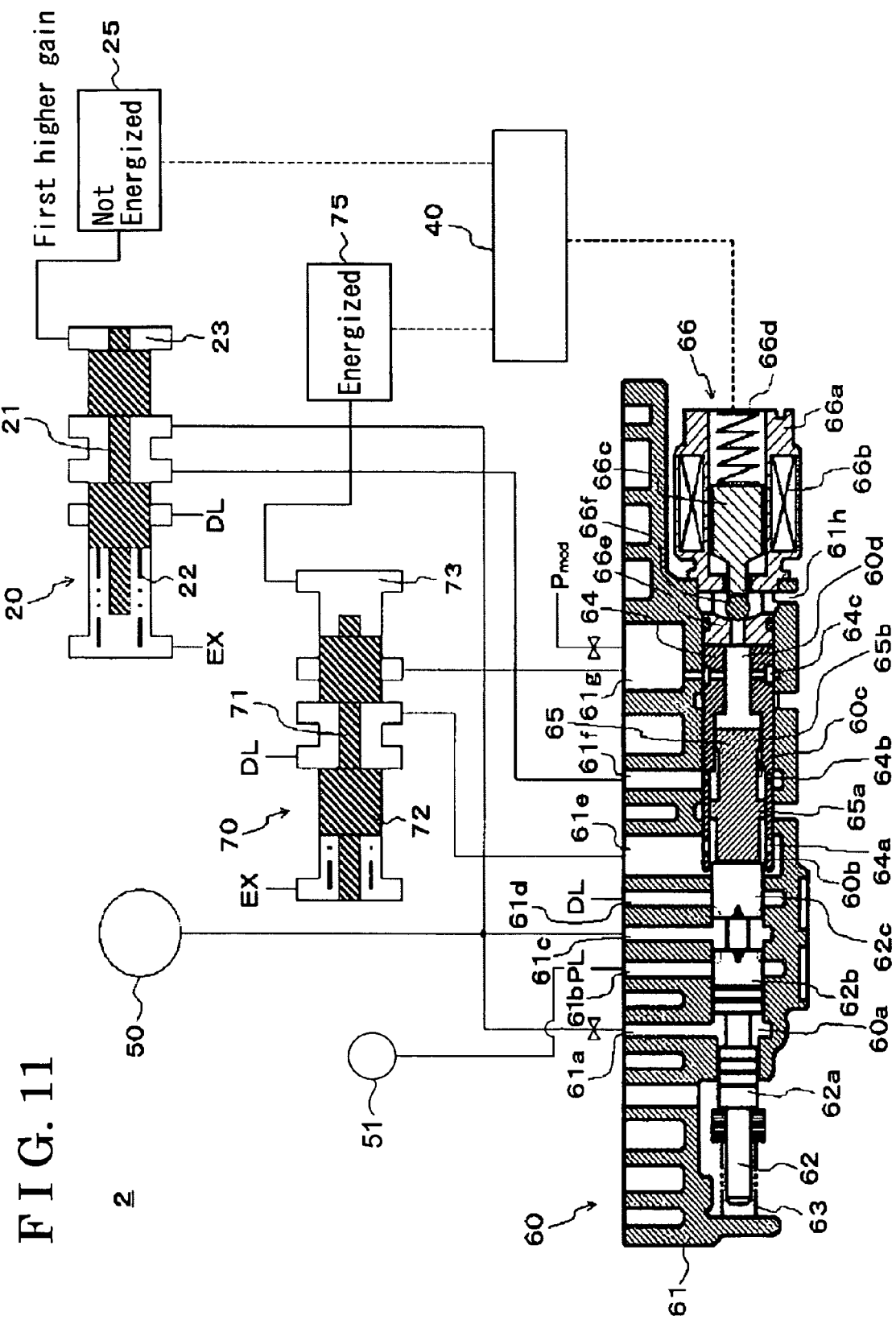
FIG. 11 is a hydraulic circuit diagram schematically showing a structure of the hydraulic control apparatus for the automatic transmission in a first higher gain state according to the second embodiment of the present invention.

Third, a first higher gain state of the hydraulic control apparatus for the automatic transmission will be explained as follows. As shown in FIG. 11, in the first higher gain state where the first on/off solenoid valve 25 is not energized and the second on/off solenoid valve 75 is energized, because the pilot pressure is inputted into the first pilot pressure chamber 60d, the pilot pressure is not inputted into the second pilot pressure chamber 60b, and the controlled hydraulic pressure is inputted into the plunger hydraulic chamber 60c, the plunger 65 pushes the spool 62 towards the spring 63, and the gain of the controlled hydraulic pressure outputted from the output port 61c increases. In the first higher gain state, the level of the controlled hydraulic pressure outputted from the output port 61c to the engagement element 50 is determined by the spring load of the spring 63, the controlled hydraulic pressure in the feedback hydraulic chamber 60a, the pilot pressure in the first pilot pressure chamber 60d, and the controlled hydraulic pressure in the plunger hydraulic chamber 60c. Namely, because the pressured force of the pilot pressure in the first pilot pressure chamber 60d is assisted by the application of the controlled hydraulic pressure in the plunger hydraulic chamber 60c in the first higher gain state, the gradient of the controlled hydraulic pressure outputted from the output port 61c to the engagement element 50 relative to the pilot pressure in the first pilot pressure chamber 60d in the higher gain state is steeper than the gradient of the controlled hydraulic pressure outputted from the output port 61c to the engagement element 50 relative to the pilot pressure in the first pilot pressure chamber 60d in the lower gain state (shown in FIG. 13).

Figure 12:
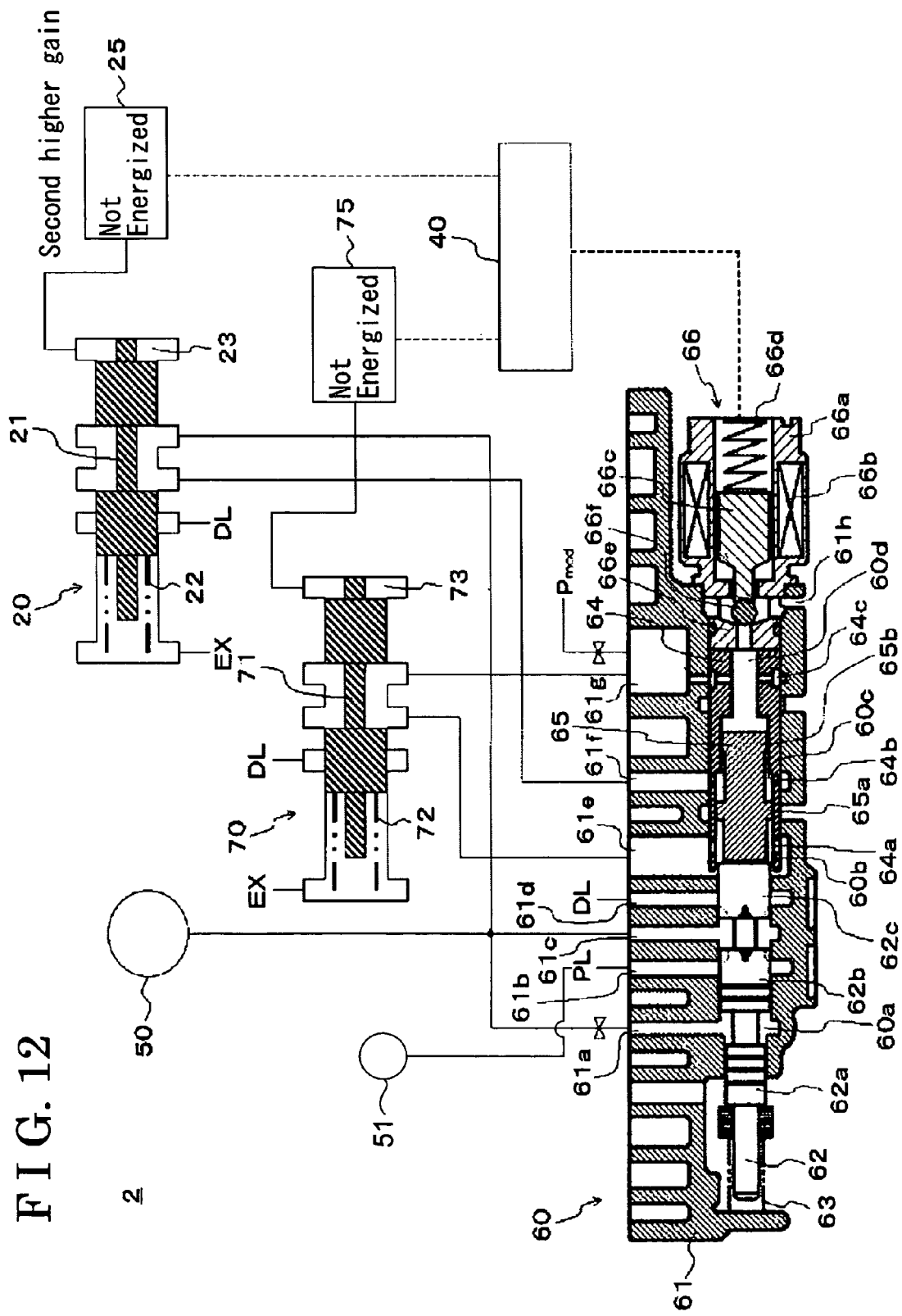
FIG. 12 is a hydraulic circuit diagram schematically showing a structure of the hydraulic control apparatus for the automatic transmission in a second higher gain state according to the second embodiment of the present invention.

Fourth, a second higher gain state of the hydraulic control apparatus for the automatic transmission will be explained as follows. As shown in FIG. 12, in the second higher gain state where the first on/off solenoid valve 25 is not energized and the second on/off solenoid valve 75 is not energized, because the pilot pressure is inputted into the first pilot pressure chamber 60d and the second pilot pressure chamber 60b and the controlled hydraulic pressure is inputted into the plunger hydraulic chamber 60c, the plunger 65 pushes the spool 62 towards the spring 63 to increase the gain of the controlled hydraulic pressure outputted from the output port 61c. In the second higher gain state, the level of the controlled hydraulic pressure outputted from the output port 61c to the engagement element 50 is defined by the spring load of the spring 63, the controlled hydraulic pressure in the feedback hydraulic chamber 60a, the pilot pressure in the second pilot pressure chamber 60b, the pilot pressure in the first pilot pressure chamber 60d, and the controlled hydraulic pressure in the plunger hydraulic chamber 60c. Namely, because the force applied by the pilot pressure in the first pilot pressure chamber 60*d* is assisted by the application of the controlled hydraulic pressure in the plunger hydraulic chamber 60*c* in the second higher gain state, the gradient of the controlled hydraulic pressure outputted to the engagement element 50 from the output port 61*c* relative to the pilot pressure in the first pilot pressure chamber 60*d* in the second higher gain state becomes steeper than that in the first lower gain state (shown in FIG. 13).

Changing the spring load of the spring 63 can change the controlled hydraulic pressure outputted from the output port 61*c* to the engagement element 50. By increasing the spring load, the level of the outputted controlled hydraulic pressure shifts upward relative to a solid line likewise the first embodiment of the present invention. By decreasing the spring load, the level of the outputted controlled hydraulic pressure shifts downward relative to the solid line likewise the first embodiment.

Further, the level of the controlled hydraulic pressure outputted from the output port 61*c* to the engagement element 50 can be varied by changing the diameters of the first land portion 65*a* and/or the second land portion 65*b* of the plunger 65 likewise the construction according to the first embodiment of the present invention. By determining the diameter of the second land portion 65*b* to be smaller than the diameter of the first land portion 65*a* and by determining the difference of the size of the diameters of the first land portion 65*a* and the second land portion 65*b* to be greater, the gradient of the controlled hydraulic pressure outputted from the output port 61*c* to the engagement element 50 becomes generally steeper. On the other hand, by determining the diameter of the second land portion 65*b* to be smaller than the diameter of the first land portion 65*a* and determining the difference of the size of the diameters of the first land portion 65*a* and the second land portion 65*b* to be smaller, the gradient of the controlled hydraulic pressure outputted from the output port 61*c* to the engagement element 50 becomes generally more moderate.

Although the valve body 61 is required to be replaced, the level of the controlled hydraulic pressure outputted from the output port 61*c* to the engagement element 50 can be changed by varying the diameters of the first land 62*a* and/or the second land 62*b* likewise the first embodiment of the present invention. By determining the diameter of the second land 62*b* to be greater than the diameter of the first land 62*a* and by determining the difference of the diameters between the first land 62*a* and the second land 62*b* to be greater, the gradient of the controlled pressure outputted from the output port 61*c* to the engagement element 50 relative to the pilot pressure in the first pilot pressure chamber 60*d* becomes generally more moderate. On the other hand, by determining the diameter of the second land 62*b* to be greater than the diameter of the first land 62*a* and by determining the difference of the size of the diameters between the first land portion 62*a* and the second land portion 62*b* to be smaller, the gradient of the controlled hydraulic pressure outputted from the output port 61*c* to the engagement element 50 relative to the pilot pressure in the first pilot pressure chamber 60*d* becomes generally steeper. A point for switching from the lower gain state to the higher gain state in characteristic diagrams (shown in FIG. 13) of the controlled hydraulic pressure relative to the pilot pressure can be determined by setting each of the diameters of the first and second lands 62*a*, 62*b* of the spool 62, the diameter of the plunger 65, and the spring load of the spring 63. In the hydraulic pressure characteristic diagram in this embodiment, the controlled hydraulic pressure is not changed even when the hydraulic pressure is applied to the plunger 65 from the first shift valve means 20 in the pilot pressure which shows the lower gain state. A point for switching from the first lower gain state to the first higher gain state and for switching from the first higher gain state to the second higher gain state and gradients are determined by setting each of the diameter of the first and second lands 62*a*, 62*b* of the spool 62, the diameter of the plunger 65, and the spring load of the spring 63, and by setting switching orders of the first shift valve means 20 and the second shift valve means 70.

Figure 14:
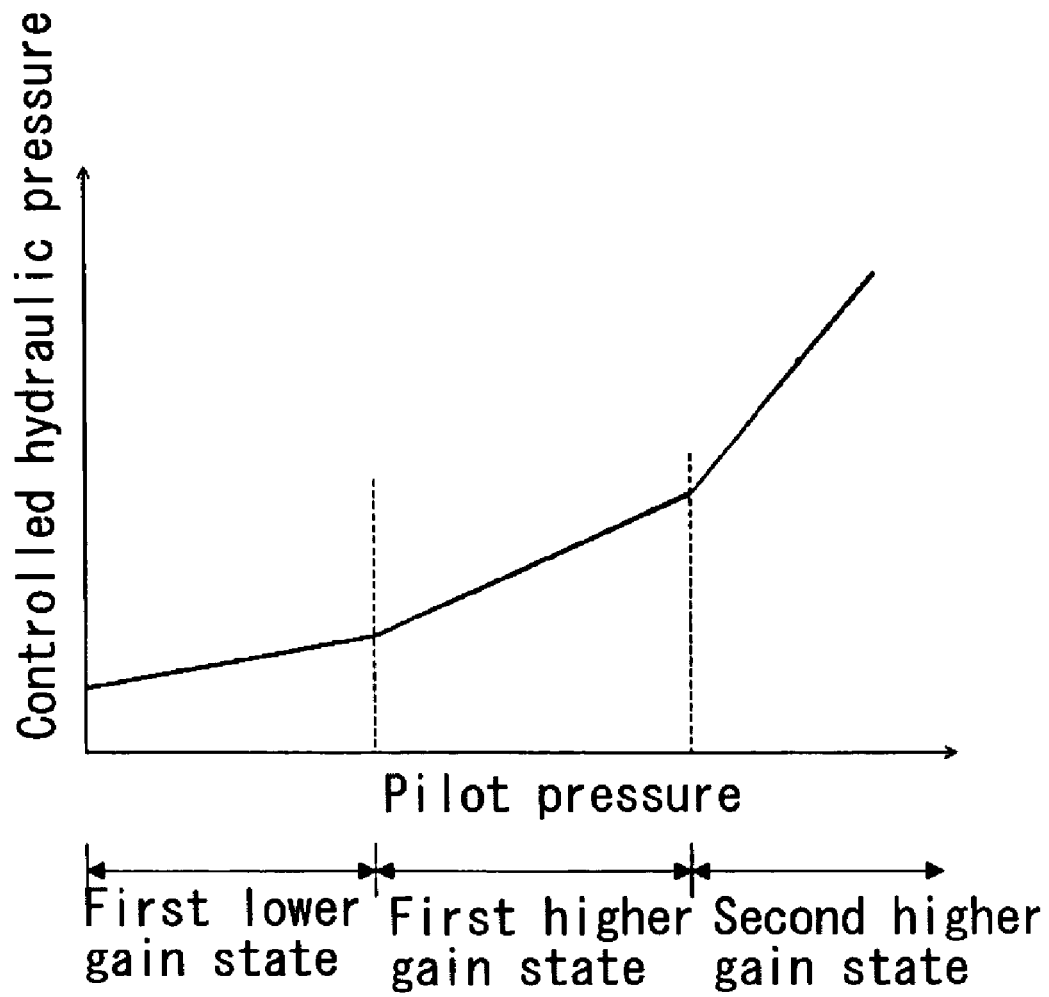
FIG. 14 is a graph schematically showing characteristics of controlled hydraulic pressure outputted from the control valve unit of the hydraulic control apparatus for the automatic transmission according to the second embodiment of the present invention.

According to the second embodiment of the present invention, without replacing the valve body 61, various gain characteristics (i.e., the gradient of the controlled hydraulic pressure outputted from the output port 61*c* to the engagement element 50 relative to the output pressure of the solenoid valve 66) can be obtained only by changing the configuration of the land portions 65*a*, 65*b* of the plunger 65 (i.e., the size of the stepped portions of the sleeve 64). Further, by additionally providing the second shift valve means 70, the characteristics shown in FIG. 13 are combined to obtain further gain characteristics as shown in FIG. 14.

According to the embodiments of the present invention, various gain characteristics can be obtained only by replacing the plunger and the sleeve to a plunger and a sleeve which have different construction in terms of dimensions of portions to which the pressure is applied without replacing the valve body.

According to the embodiments of the present invention, by additionally providing the second shift valve, another gain characteristics can be obtained.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A hydraulic control apparatus for an automatic transmission which supplies a controlled hydraulic pressure, which is generated by regulating a line pressure supplied from a hydraulic pressure source, to an engagement element, comprising:

a control valve unit including:
  a line pressure input port to which the line pressure is inputted;
  an output port for outputting the controlled hydraulic pressure;
  a spool housed in a valve body so as to slide therein and for selectively opening and closing the line pressure input port and the output port;
  a spring for biasing the spool in one direction;
  a feedback hydraulic chamber introduced with the controlled hydraulic pressure and operated to push the spool in a biasing direction of the spring;
  a pilot pressure chamber filled with a pilot pressure and operated to push the spool against a biasing force of the spring;
  a pilot pressure control device for controlling the pilot pressure in the pilot pressure chamber;
  a sleeve provided at an opposite side of the spring relative to the spool;
  a plunger positioned inside of the sleeve so as to slide therein; and at least one plunger hydraulic chamber for pushing the plunger when the controlled hydraulic pressure is introduced therein so as to push the spool in a direction against the biasing direction of the spring; and a switching device provided at a hydraulic passage between the output port and the plunger hydraulic chamber and for selectively establishing a communication between the output port and the plunger hydraulic chamber.

2. The hydraulic control apparatus for the automatic transmission according to claim 1, further comprising:

a controller for controlling an operational state of the pilot pressure control device and for controlling the switching device on the basis of a predetermined information from a vehicle.

3. The hydraulic control apparatus for the automatic transmission according to claim 1, further comprising:

a second pilot pressure chamber provided between the spool and the plunger inside of the sleeve and pushing the spool in the direction against the biasing direction of the spring when the pilot pressure is introduced therein; and a second switching device for selectively establishing a communication between the output port and the second pilot pressure chamber.

4. The hydraulic control apparatus for the automatic transmission according to claim 2, further comprising:

a second pilot pressure chamber provided between the spool and the plunger inside of the sleeve and pushing the spool in the direction against the biasing direction of the spring when the pilot pressure is introduced therein; and a second switching device for selectively establishing a communication between the output port and the second pilot pressure chamber.

5. The hydraulic control apparatus for the automatic transmission according to claim 3, wherein a controller controls the second switching device on the basis of a predetermined information from a vehicle.

6. The hydraulic control apparatus for the automatic transmission according to claim 4, wherein the controller controls the second switching device on the basis of a predetermined information from a vehicle.

7. The hydraulic control apparatus for the automatic transmission according to claim 1, wherein the pilot pressure control device is positioned at an opposite side of the spool relative to the sleeve; and the sleeve having a diameter greater than a diameter of the spool is provided in the valve body and is lidded by attaching the pilot pressure control device to the valve body.

8. The hydraulic control apparatus for the automatic transmission according to claim 2, wherein the pilot pressure control device is positioned at an opposite side of the spool relative to the sleeve; and the sleeve having a diameter greater than a diameter of the spool is provided in the valve body and is lidded by attaching the pilot pressure control device to the valve body.

9. The hydraulic control apparatus for the automatic transmission according to claim 3, wherein the pilot pressure control device is positioned at an opposite side of the spool relative to the sleeve; and the sleeve having a diameter greater than a diameter of the spool is provided in the valve body and is lidded by attaching the pilot pressure control device to the valve body.

10. The hydraulic control apparatus for the automatic transmission according to claim 4, wherein the pilot pressure control device is positioned at an opposite side of the spool relative to the sleeve; and the sleeve having a diameter greater than a diameter of the spool is provided in the valve body and is lidded by attaching the pilot pressure control device to the valve body.

11. The hydraulic control apparatus for the automatic transmission according to claim 5, wherein the pilot pressure control device is positioned at an opposite side of the spool relative to the sleeve; and the sleeve having a diameter greater than a diameter of the spool is provided in the valve body and is lidded by attaching the pilot pressure control device to the valve body.

12. The hydraulic control apparatus for the automatic transmission according to claim 6, wherein the pilot pressure control device is positioned at an opposite side of the spool relative to the sleeve; and the sleeve having a diameter greater than a diameter of the spool is provided in the valve body and is lidded by attaching the pilot pressure control device to the valve body.

13. The hydraulic control apparatus for the automatic transmission according to claim 1, wherein the pilot pressure control device is a solenoid valve.

14. The hydraulic control apparatus for the automatic transmission according to claim 2, wherein the pilot pressure control device is a solenoid valve.

15. The hydraulic control apparatus for the automatic transmission according to claim 3, wherein the pilot pressure control device is a solenoid valve.

16. The hydraulic control apparatus for the automatic transmission according to claim 4, wherein the pilot pressure control device is a solenoid valve.

17. The hydraulic control apparatus for the automatic transmission according to claim 5, wherein the pilot pressure control device is a solenoid valve.

18. The hydraulic control apparatus for the automatic transmission according to claim 6, wherein the pilot pressure control device is a solenoid valve.

19. The hydraulic control apparatus for the automatic transmission according to claim 7, wherein the pilot pressure control device is a solenoid valve.

20. The hydraulic control apparatus for the automatic transmission according to claim 8, wherein the pilot pressure control device is a solenoid valve

* * * * *